United States Patent [19]

Bratten

[11] Patent Number: 4,957,630
[45] Date of Patent: Sep. 18, 1990

[54] DRUM FILTER WITH DIVERGENT HOLE PERFORATED FILTER MEDIA

[76] Inventor: Jack R. Bratten, 5970 St. James Dr., West Bloomfield, Mich. 48033

[21] Appl. No.: 289,730

[22] Filed: Dec. 27, 1988

[51] Int. Cl.⁵ .......................................... B01D 33/04
[52] U.S. Cl. ................................... 210/358; 210/396; 210/402; 210/494.2; 209/270
[58] Field of Search ............... 210/326, 327, 350, 358, 210/396, 402, 493.1, 494.1, 494.2, 415, 498; 209/288, 290, 291, 292, 270; 68/903; 162/323, 372; 34/58, 108; 55/497, 498; 494/56

[56] References Cited

U.S. PATENT DOCUMENTS

| | | | |
|---|---|---|---|
| 2,910,183 | 10/1959 | Hayes | 210/498 |
| 3,420,373 | 1/1969 | Hunter | 210/415 |
| 3,581,903 | 6/1971 | Holz | 210/415 |
| 4,276,159 | 6/1981 | Lehman | 210/415 |
| 4,288,330 | 9/1981 | Strub | 210/498 |
| 4,407,720 | 10/1983 | Bratten | 210/784 |
| 4,619,737 | 10/1986 | Halz | 210/402 |
| 4,663,040 | 5/1987 | Elizonda et al. | 210/402 |
| 4,670,143 | 6/1987 | Bratten | 210/402 |
| 4,681,689 | 7/1987 | Stannard et al. | 210/404 |

Primary Examiner—W. Gary Jones
Assistant Examiner—Wanda L. Millard
Attorney, Agent, or Firm—John R. Benefiel

[57] ABSTRACT

A drum filter is disclosed in which a filter media layer is applied over a section of a drum member disposed in a tank which receives a liquid to be filtered, the filter media layer constructed of a thin metal with a pattern of holes formed by chemical etching, with the diameters thereof increasing in the direction of flow. The diverging hole shape reduces the tendency for plugging of the hole. One or more scraper blades are urged against the filter media layer which is rotated past the scraper blade causing a flexing of each section of the filter media layer to unplug any holes which do become clogged.

12 Claims, 5 Drawing Sheets

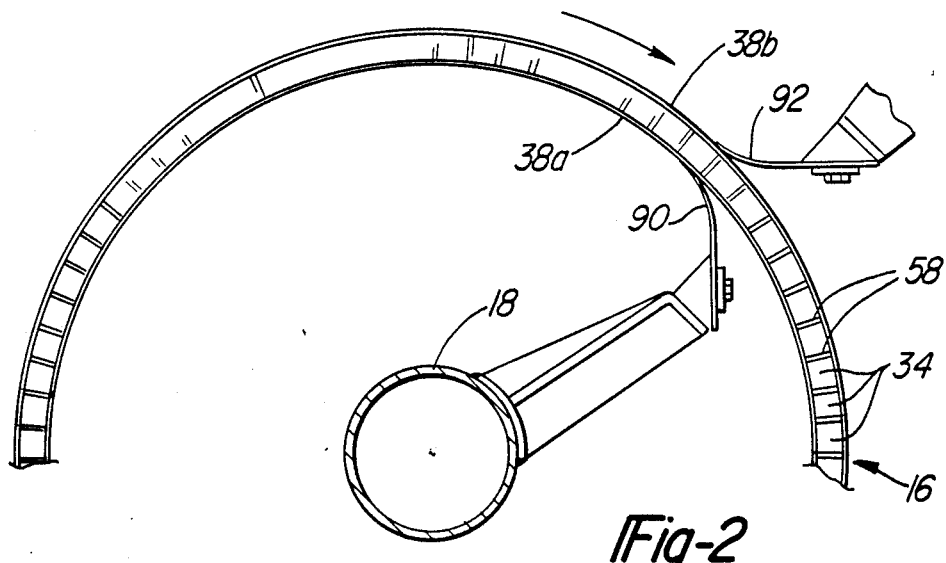
_Fig-2_
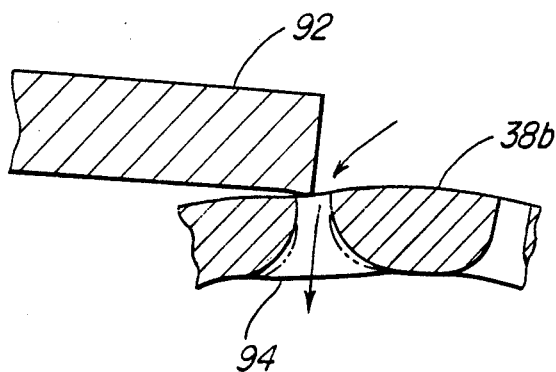
_Fig-5_

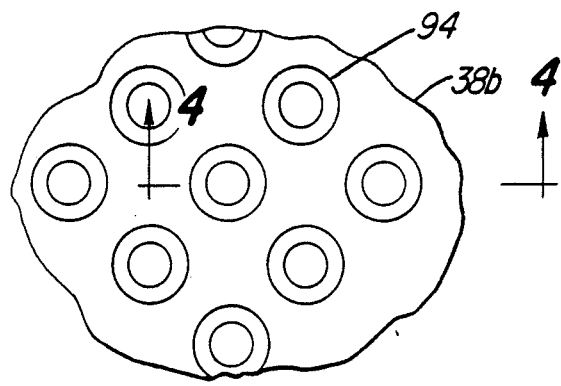
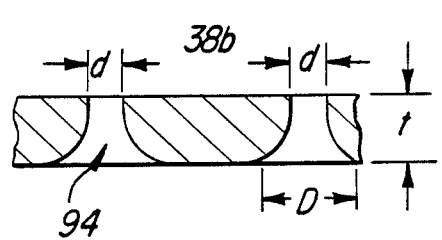
*Fig-3*
*Fig-4*
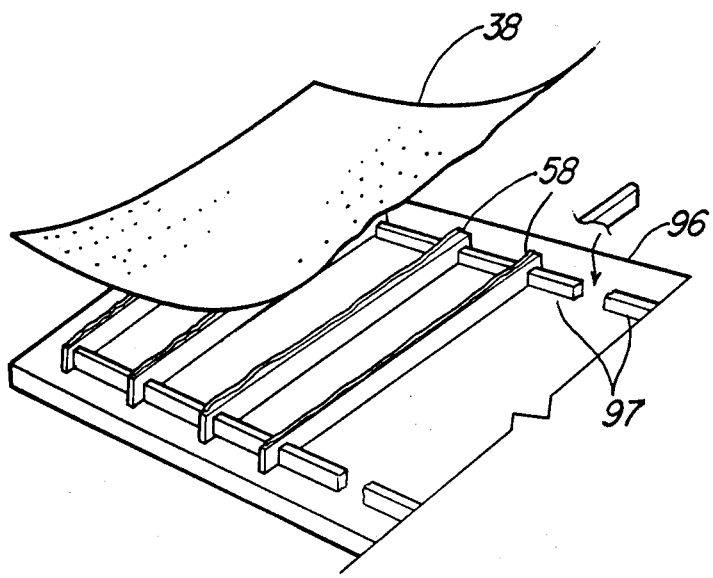
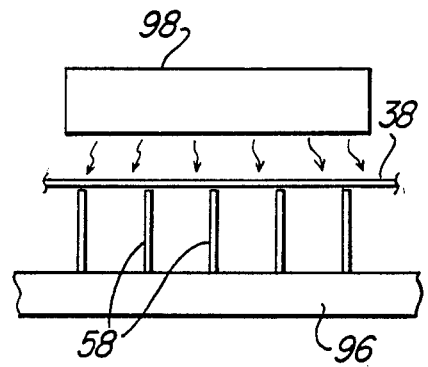
*Fig-6*
*Fig-7*
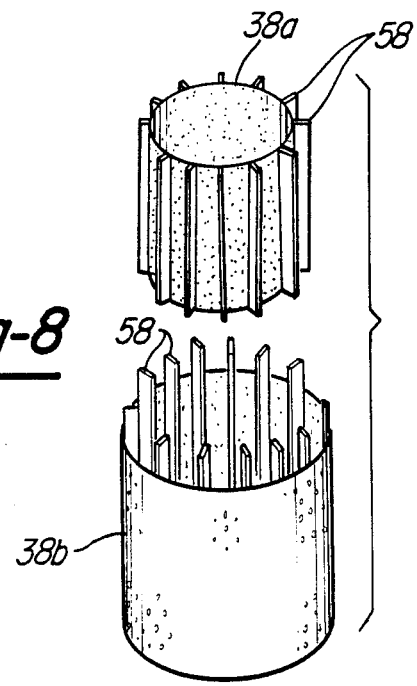
*Fig-8*

DRUM FILTER WITH DIVERGENT HOLE PERFORATED FILTER MEDIA

BACKGROUND OF THE INVENTION

This invention concerns filters, and more particularly filters of the type comprising a drum carrying one or more filtering media layers through which the liquid to be filtered is directed. Disclosed in each of U.S. Pat. Nos. 4,407,720; 4,622,145; and 4,735,730 is a filter comprised of a rotatable drum disposed in a tank containing the liquid to be filtered. The drum is formed by a circumferential array of axially extending bars, the spaces between which form flow paths for liquid after it has passed through the filter media layer disposed about the outside of the bars. The filter media layer is also disposed about the inside of the drum in the vertical axis drum filter shown in U.S. Pat. No. 4,622,145.

The filter media layer in these patents is disclosed as a series of windings of wedge shaped wire, which are spaced apart to create filtering openings which increase in size in the direction of flow. The wedge wire filter media is advantageous in that the diverging shape tends to prevent clogging by particles wedging in the openings.

The filter openings so formed are slit shaped since they are defined by the gap between successive windings of the wedge wire. In certain filter applications such as removing machined aluminum chips, flake shaped solids must be removed from the liquid.

In those applications, an unacceptable proportion of the solid flakes will sometimes pass through the slit shaped openings, and thus are present in the filtered liquid to an excessive level.

If the spacing is made very close to prevent the passage of these flakes, gelatinous material such as "tramp oil" collecting in the system will clog the opening.

While a perforated plate or wire mesh filter media layer could be employed to establish a less elongated shaped opening, and sized to prevent passage of all of the filtered solid particles, this approach would lose the self-cleaning feature of the wedge-shaped filtering openings. Also, the uneven surface of a wire mesh would prevent effective scraping of the surface to remove accumulated solids.

Even with wedge-shaped openings, filter media will sometimes tend to pack with solids and become clogged, and it would be advantageous to be able to unclog such openings during periodic cleanings.

Scraping of the filter surface is often done to remove a heavy accumulation of solids on the surface, but this is not usually effective to clear the filter media openings, particularly if finely sized spaces are employed in an effort to remove the thin flakes described above.

Backwashing is also performed, which is effective, but less so on the wedge-shaped filtering openings, which tend to pack with the reverse backwashing flow.

Accordingly, it is an object of the present invention to provide a drum filter in which the tendency for flake-shaped solids to pass through the filter media layers is minimized.

It is a further object of the present invention to provide a drum filter in which the clogging of the openings may be effectively cleared by a scraping operation.

Another object of the present invention is to provide a method of manufacturing a drum filter which incorporates a very thin porous sheet layer as the filter media.

SUMMARY OF THE INVENTION

These and other objects of the present invention which will be apparent upon a reading of the following specification and claims are achieved by a drum filter having one or more filter media layers constructed of a very thin sheet material. The thin sheet material is formed with a pattern of small diameter round holes preferably by etching, which holes increase in diameter or diverge in the direction of filtering flow through the media to decrease the tendency for clogging of the openings.

The filter media layer is very thin, on the order of 0.01-0.025 inches thick, and when scraped with a wiper, the openings are flexed to a degree sufficient to cause momentary expansion of the openings, and to dislodge any material clogging the openings.

The round holes prevent the entrance of thin flakes while being of relatively larger size, i.e., on the order of 0.015 inch in diameter, such that the tendency to be clogged with tramp oil or other gelatinous material is minimal.

A flexible scraping blade is urged against the very thin filter media layer so as to cause flexing of the layer as it passes into contact with the blade to a degree sufficient to appreciably expand the holes momentarily, and cause any clogging solids to be released and clear the opening.

The drum filter incorporating such filter media is preferably of a vertical axis design, and the perforate sheet layer is carried both on the inside and outside of the drum surface, attached to closely spaced spacer strips forming axial flow passages.

In another version, each of the filter media layers is corrugated and attached to the inside and outside of a cylindrical member, the inside of the corrugations providing the axial flow passages.

In still another version, a series of U or Vee channels are welded together and formed into the drum, with the perforate layer stretched over the outside of the drum by a clamping bar bolted into one of the channels. Expander rings enable an inner layer to be pressed against the Vee channel.

The first embodiment may be constructed by assembling one half the bars on a fixture and gluing one of the media layers to the bars, and forming the same into a cylinder and repeating these steps to form a second cylinder, and interfitting the two to form the completed drum member having inner and outer cylindrical filter layers.

The second embodiment is constructed by welding the corrugated porous sheet cylinders to the inside and outside of a solid tubular member, with an annular member formed with holes aligned with the corrugation openings welded to one end of the solid tubular member.

The drum member is preferably formed in two sections able to be disassembled from each other, so as to enable the filter media section to be readily changed to be matched to the particular filtering requirements.

DESCRIPTION OF THE DRAWINGS

FIG. 2 is a transverse sectional view taken through the drum filter shown in FIG. 1.

FIG. 3 is a fragmentary plan view of the filter media sheet material incorporated in the drum filter shown in FIGS. 1 and 2.

FIG. 4 is a fragmentary sectional view of the filter media sheet material of FIG. 3.

FIG. 5 is a greatly enlarged fragmentary sectional view of a portion of the filter media layer being flexed by a scraper blade to act to unclog the holes of the filter media layer.

FIG. 6 is a fragmentary perspective view of one of the filter media layers being assembled to a set of axial spacer strips with the aid of a fixture, also shown.

FIG. 7 is a diagrammatic view of an assembled but unformed filter media layer being glued to the spacer strips with the aid of a heater, also shown.

FIG. 8 is an exploded perspective view of the inside and outside filter media layers formed into cylinders and attached to alternate spacer strips, being assembled together.

DETAILED DESCRIPTION

In the following specification a particular embodiment is described in detail, but it should be understood that the same is not intended to be limiting inasmuch as the invention may be practiced in a variety of forms.

Figure 1:
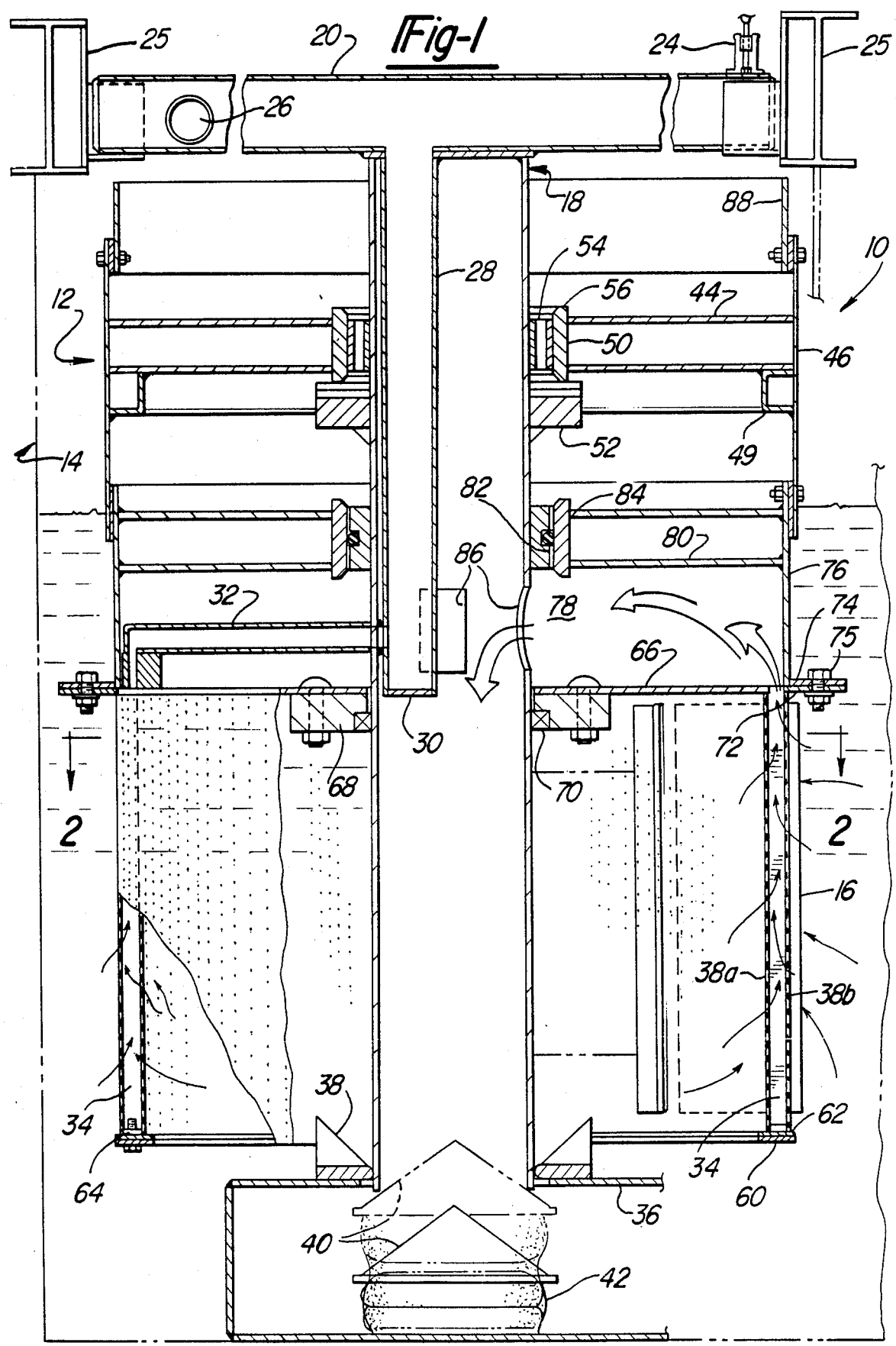
FIG. 1 is a longitudinal partially sectional view of a drum filter according to the present invention.
Figure 9:
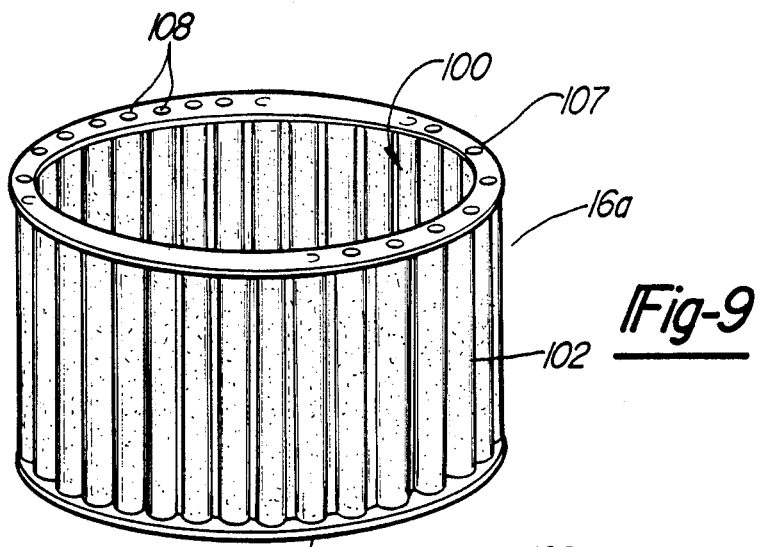
FIG. 9 is a perspective view of a drum member constructed according to an alternate embodiment of the present invention.
Figure 10:
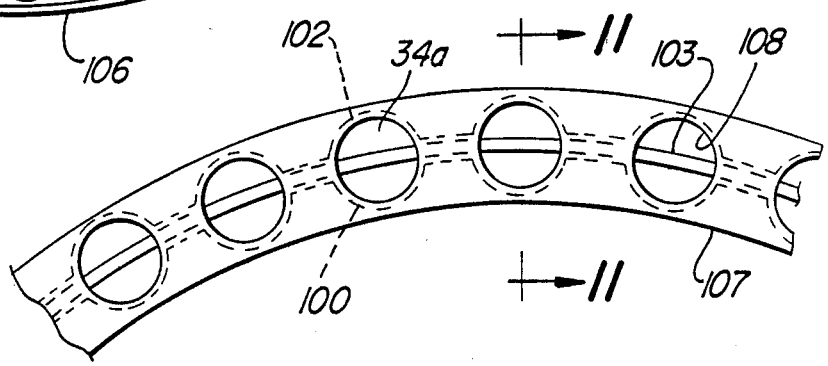
FIG. 10 is an enlarged fragmentary end view of a portion of the drum member shown in FIG. 10.
Figure 11:
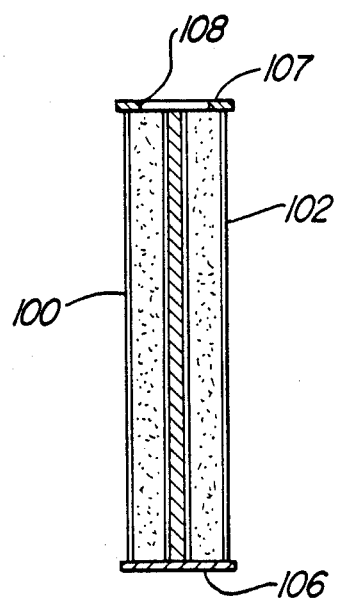
FIG. 11 is a fragmentary sectional view of the drum member shown in FIGS. 10 and 11.
Figure 12:
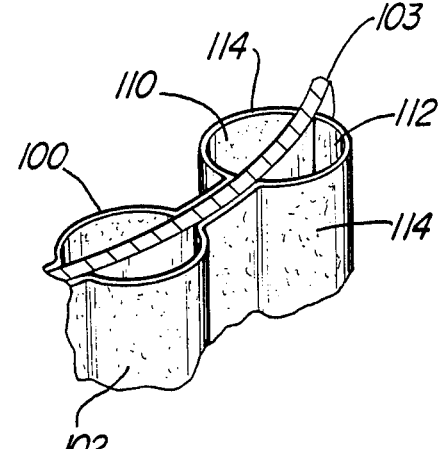
FIG. 12 is a fragmentary perspective view of the end of drum member shown in FIGS. 9–11.

Referring to FIG. 1, a drum filter 10 according to the present invention is shown in partial section, which includes a drum member 12 positioned vertically in a tank 14. The tank 14 receives the liquid to be filtered, which is maintained at a level such as to keep covered a lower filtering section 16 of the drum member 12 which bears the porous filter media portion thereof.

The drum member 12 is rotatably mounted on a stationary central tube 18 supported in the tank 14 by means of a horizontal square tube 20 held with clamps 24 in saddles 25 fixed on either side of the tank 14. Square tube 20 is welded to the upper end of the central tube 18.

The square tube 20 also serves as a conduit for a flow of clean backwash liquid received in port 26; and backwash liquid flows into a supply tube 28, extending within the central tube 18, and plugged at its end with a cap 30.

The clean backwash liquid is thus directed into a porting tube 32, which registers successively with each axial flow passage 34 arrayed about the circumference of the drum member 12. This arrangement is described in detail in the above-referenced U.S. patents.

The lower end of the central tube 18 is received into a suction box 36 mounted in the bottom of the tank 14, the interior of the suction box 36 connected to the main circulation pump to draw liquid through inner and outer porous layers 38A and 38B of the lower filtering section 16 of drum member 12. Sloping pieces 38 are bolted to the top of the suction box 36 to guide the central tube 18 into position.

A plastic valving cone 40 is raised by an air bellows 42 to seal the opening into the suction box 36 when the central tube 18 is withdrawn from the tank, preventing entrance of unfiltered tank liquid and enabling isolation of individual drum filters in a multiple filter installation.

The drum member is supported on the central tube 18 by a plurality of spokes 44 welded to the interior of an upper band piece 46, with a supporting rim 48 also welded thereto to provide increased support therefor.

A thrust bearing 50 is supported on a ring 52 welded to the central tube 18, serving to support the drum member 12 via the spokes 44, a centering bearing 54 also provided for an inner ring 56 connecting the inner ends of the spokes 44.

The lower filtering section 16 of the drum member 12 is comprised of the inner and outer layers 38A, 38B of a filter media material described in detail hereinafter, attached to the inside and outside of a circumferential array of longitudinally extending rigid thin strips 58 (FIG. 2), spaced apart to define the axial flow passages 34.

An end ring 60 is bolted to the lower ends of the bars 58, with a gasket 62 serving to seal the lower ends of the passages 34. Weld nuts 64 are employed to enable bolting thereto.

A first plenum disc 66 is welded to the inside of the upper ends of the bars 58 with a bearing block 68 and seal 70 mounted beneath the plenum disc 66 and in engagement with the periphery of fixed tube 18.

A lower flange ring 72 is welded to the outside of the upper ends of the rigid strips 58, which abuts an upper flange ring 74 and is bolted thereto with bolt and nut assemblies 75.

An intermediate solid band member 76 is welded to the upper flange ring 74, extending axially upward to define a collecting chamber 78 communicating with all of the axial passages 34 to receive flow therefrom.

A second plenum disc 80 spaced above the first plenum disc 66 is welded to the inside of the intermediate band member 76 to define the top of the chamber 78, with a bearing block 82 and seal 84 completing the rotational support of the drum 12 on the fixed tube 18 and sealing of the chamber 78.

A series of openings 86 are in the central tube 18 aligned with the chamber 70 to allow flow from the axial passages 34, to the chamber 78, into the central tube 18 and out through the suction box 36.

The intermediate band member 76 is bolted to the upper band member 46 as shown, with a saw tooth drive ring 88 bolted to the top of the upper band member 46. This enables an indexing drive for the drum member 12 such as described in detail in U.S. Pat. No. 4,622,145.

This periodically advances the drum member 12 an increment corresponding to two or more of the spaces between the strips 58. This directs a backwashing flow to successive spaces 34 about the drum member 12 through the backwash indexing tube 32, as described in detail in the above U.S. patent.

Inner and outer scraper blades 90, 92 are fixed to engage the inner and outer filter media layers 38A, 38B respectively, just upstream of the backwash indexing tube 32. The scraper blades 90, 92 are of a thin gauge "blue steel" so as to be somewhat flexible, and are mounted to be deflected to a nearly tangent condition against the layers 38A, 38B and thus are biased against the surface of the inner and outer filter media layers 38A, 38B.

This relationship creates a deflecting force on the filter media layers 38A, 38B for a purpose that will be described herein, and also maintains a scraping contact while accommodating any out of round condition of the drum member 12 as the drum member 12 rotates past the relatively fixed scraper blades 90, 92.

According to the concept of the present invention, the filter media layers 38A, 38B are each comprised of thin sheet metal having an array of round holes 94 photoetched through one side thereof, as shown in FIG. 3.

As shown in FIG. 4, the etching action produces a widening hole 94 as the etching process progresses through the thickness of the material.

For the filtering operations contemplated for the present filtering apparatus, a thin 0.015 inch thickness, layer of stainless steel having 0.015 inch diameter holes and a 21% open area has been found effective. Such material is commercially available from Stork Veco International Corporation, a division of Perforated Products, Inc. of Brookline, MA 02146.

Each layer 38A and 38B is installed oriented so that the diameter of the hole increases in the direction of the flow, to a final diameter of approximately 0.022 inch.

Thus, the nonclogging characteristic of wedge wire is achieved with round holes rather than the slit shaped openings of wedge wire, to effectively enable filtering out of very thin flakes, which are of substantial width, without resorting to very fine openings apt to be plugged with tramp oil and other gelatinous particles.

According to another aspect of the present invention, a flexing of the filter media layer is generated to induce an unplugging of the holes. This is generated by utilizing the thin filter media material described above, combined with the forcible engagement of the scraper blades 90, 92 as illustrated in FIG. 5. This flexing produces a momentary significant stretching of the material to slightly increase the diameter of the holes 94, creating an unclogging effect by loosening any solids or other material which may be packed therein, so that the filtering flow will sweep the material out. This enhances the nonclogging effect of the increasing diameter of the holes, to afford a filtering operation which may be operated for long periods without the need for any additional cleaning of the screen, other than the scraping and backwashing as described.

The spacing of the strips 58 also affects the flexibility of the layers 38A, 38B, with a one-half inch spacing being found to provide a proper balance between strength and rigidity for the specific example of the material given above. Such parameters may vary for a given application.

The thinness of the material requires special techniques to fabricate a drum filter.

One approach to such fabrication is illustrated in FIGS. 6–8. The strips 58 are laid in a flat fixture 96 having spacer bars 97 locating the proper spacing of the strips 58. This spacing is double the spacing of the strips 58, in the completed filter. A sheet 38 of the material suitably sized is laid over the strips 58 after a heat settable epoxy has been applied to the upper surface of the strips 58, and the assembly is then heated in an oven or with a radiant heater 98 to set the epoxy adhesive.

One such sheet-bar assembly is formed into a cylinder with the strips 58 facing out and one facing in, with the two cylinders fit together to complete the filter section 16. The remaining components are then added to complete the drum member 12.

This avoids welding of the thin material, which can sometimes result in large holes which allows bypass of unfiltered liquid.

Another approach is shown in FIGS. 9–12, in which two pieces 100, 102 of perforated material are each corrugated and wrapped on the inside and outside of an imperforate hollow cylinder 103 of sheet metal and welded thereto in the valleys to form the filtering section 16A of the drum member 12. A solid flat ring 106 is attached at one end, while a perforated flat ring 107 is attached at the other. The holes 108 are aligned with the openings 110, 112 formed by each outward corrugation 114 to enable the lengthwise corrugations 14 to define the flow passages 34A.

Figure 13:
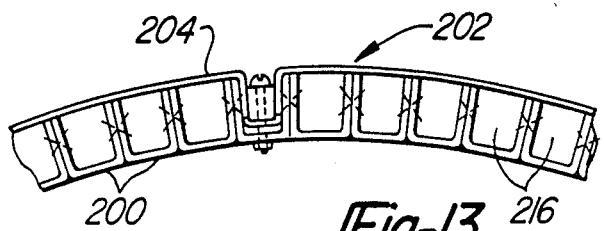
FIG. 13 is a fragmentary end view of a portion of a drum member of another embodiment of the present invention.
Figure 14:
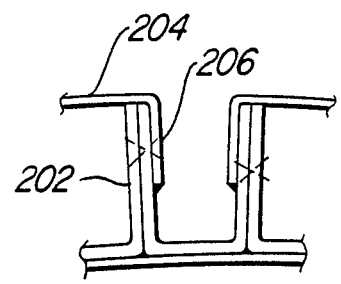
FIG. 14 is an enlarged end view of an opposite portion of the drum member shown in FIG. 13.
Figure 15:
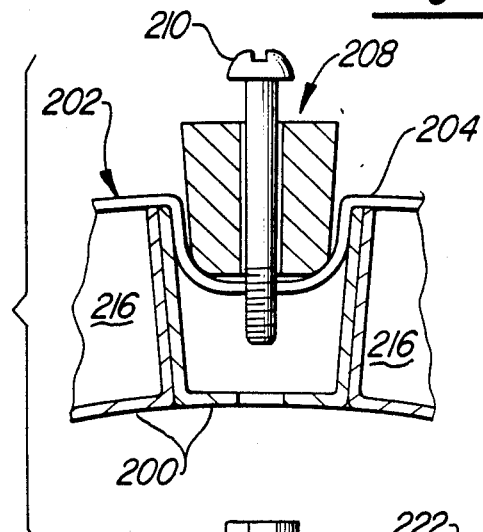
FIG. 15 is a further enlarged fragmentary view of the drum member portion shown in FIG. 13.

Still another approach is shown in FIGS. 13–15, constituting the preferred embodiment of the invention, in which a series of U-channels 200 are welded together through adjoining sidewalls and thereafter formed into a drum 202. A perforate metal layer 204 is wrapped about the exterior of the drum 202 and the edges 206 welded to a channel 200.

A stretching bar 208 is then bolted into a U-channel 200 spanned by the perforate metal layer 204 by a series of capscrews 210 and weldnuts 212 so as to draw a section of the metal layer 204 into the channel 200 and stretch the same about the periphery of the drum 202.

The interior of each of the channels 200 thus forms the lengthwise extending passages 216 for collecting flow through the filtering perforate metal layer 204.

Figure 16:
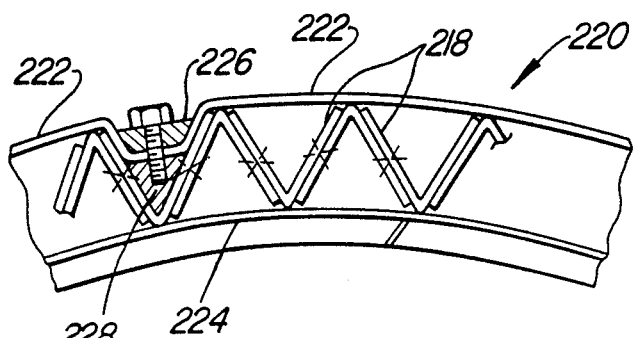
FIG. 16 is a fragmentary end view of a drum member according to yet another embodiment of the present invention.

A variation of this is shown in FIG. 16, in which a series of Vee-channels 218 are welded together along juxtaposed side walls, and the assemblage formed into a drum 220, forming outwardly and inwardly facing channels.

An outer perforate layer 222 and inner perforate layer 224 are provided covering the outwardly and inwardly facing channels respectively. The outer perforate layer is stretched by one or more stretching bars 226 bolted to weldnuts 228.

The inner layer 224 is held against the inner facing channels by split expander rings 230 inserted inside the drum 220.

Accordingly, it can be appreciated that the above objects of the present invention have been achieved.

While a vertical axis drum filter has been described as a particular embodiment of the present invention, it is of course possible to utilize the concept in horizontal axis drum filters as described in U.S. Pat. No. 4,407,720. Similarly, many variations in the constructional details can also be made.

The segmented construction of the drum member 12 allows the filtering section 16 to be detached and replaced readily enabling a particularly configured filter media layer type to be emplaced as needed for a particular filtering situation.

I claim:
1. A drum filter comprising:
a tank adapted to receive liquid to be filtered;
a drum member having an outer surface disposed in said tank, said drum member having attached to a portion of its outer surface a porous filter media layer through which is drawn liquid to be filtered from said tank by flow in one direction through said filter media layer;

means for collecting said flow of liquid after passing through said filter media layer;

said filter media layer comprised of a thin layer of perforated metal having a pattern of substantially round holes increasing in diameter through the thickness of said layer, to diverge in said direction of flow through said filter media layer, whereby clogging of said holes tends to be cleared by said diverging shape of said holes.

2. The drum filter according to claim 1 wherein said filter media layer completely encircles said drum member, and further including a series of spacer strips supporting said filter media layer against the pressure of said liquid flowing therethrough.

3. The drum filter according to claim 2 further including means for rotating said drum member about its own axis and further including a fixed scraper blade urged against said filter media layer to pass over each section thereof as said drum member rotates, said filter media layer being sufficiently flexible to be flexed as said scraping blade passes thereover sufficiently to tend to cause unclogging of any plugged holes.

4. The drum filter according to claim 3 further including a second filter media layer extending around said drum member, one of said filter media layers disposed on the inside and the other on the outside of said drum member, on either side of said spacer strips; and further including a second scraper blade urged into engagement with a respective filter media layer.

5. The drum filter according to claim 3 wherein said scraper blade is constructed of thin metal mounted to be deflected to a nearly tangent condition against said filter media layer and directed oppositely to the direction of rotation of said drum member.

6. The drum filter according to claim 2 wherein said drum member includes an imperforate section and said filter media layer comprises a lower section of said drum member, said respective sections detachably connected to each other, whereby said filter media layer can be replaced.

7. The drum filter according to claim 1 wherein said filter media layer is corrugated with valleys and said drum is an imperforate hollow cylinder with the valleys against and attached to said hollow cylinder.

8. The drum filter according to claim 7 further including a second filter media layer, each one of said filter media layers positioned on the inside and the other on the outside of said imperforate hollow cylinder.

9. The drum filter according to claim 8, further including a solid flat ring attached to one end of said hollow cylinder covering one end of the corrugations and a flat ring having a series of holes spaced in correspondence to said corrugations secured to the other end of said hollow cylinder with said holes aligned with the peak of said corrugations.

10. The drum filter according to claim 1 wherein said filter media layer is constructed of a sheet metal of a thickness on the order of 0.010–0.025 inch thick with round holes on the order of 0.015 inch in diameter.

11. The drum filter according to claim 1 wherein said drum member is formed of a series of side by side channels welded together and formed into said drum with said filter media layer stretched thereover.

12. The drum filter according to claim 11 wherein said channels are Vee shaped and alternately facing in and out, and further including an inner filtering media layer expanded into contact with the inwardly facing channel.

* * * * *